United States Patent [19]

Oishi

[11] 4,174,749
[45] Nov. 20, 1979

[54] AIR CONDITIONING DISPLAY SYSTEM FOR VEHICLES

[75] Inventor: Hideo Oishi, Okazaki, Japan
[73] Assignee: Mitsubishi Jidosha Kogyo Kabushiki Kaisha, Tokyo, Japan
[21] Appl. No.: 881,783
[22] Filed: Feb. 27, 1978
[51] Int. Cl.² .............................................. F28F 27/00
[52] U.S. Cl. .............................. 165/11; 73/432 AD; 165/43; 237/12.3 B; 340/52 F; 340/525
[58] Field of Search ............... 165/11, 42, 43; 62/126; 236/94; 340/52 F, 79, 286 M, 524, 525; 73/432 AD; 123/41.15; 237/12.3 B

[56] References Cited

U.S. PATENT DOCUMENTS

| | | | |
|---|---|---|---|
| 3,626,370 | 12/1971 | Stubbs | 340/524 X |
| 3,939,456 | 2/1976 | Curtis | 236/94 X |
| 4,016,534 | 4/1977 | Kobayashi et al. | 340/52 F |
| 4,025,896 | 5/1977 | Hintze et al. | 340/79 X |
| 4,035,764 | 7/1977 | Fujinami et al. | 340/52 F |
| 4,038,061 | 7/1977 | Anderson et al. | 62/126 |
| 4,109,235 | 8/1978 | Bouthors | 340/52 F |

Primary Examiner—Samuel Scott
Assistant Examiner—Margaret A. Focarino
Attorney, Agent, or Firm—Oldham, Oldham, Hudak & Weber Co.

[57] ABSTRACT

An air conditioning display system for a vehicle comprising a vehicle's air conditioner proper including a plurality of air intake ducts, a plurality of air discharge ducts, a plurality of dampers, and a fan unit, an air conditioner actuator actuating the dampers and the fan unit thereby introducing and discharging air into and out of the air conditioner proper, and a display device including a display panel carrying the picture of the vehicle body portions around the front seat for displaying the flowing patterns of air out of the air conditioner proper. Illuminating means is disposed behind the display panel and is selectively energized so that the occupant can readily visually confirm the flow air from the duct outlets.

34 Claims, 17 Drawing Figures

AIR CONDITIONING DISPLAY SYSTEM FOR VEHICLES

BACKGROUND OF THE INVENTION

This invention relates to an air conditioning display system which operates in interlocking relation with an actuator for an air conditioner used in an automotive vehicle or the like and pictorially displays the directions of air flow and presence or absence of air flow on a display panel so that an occupant manipulating the air conditioner actuator can readily know the operating state of the air conditioner by merely looking at the display panel.

In a conventional display system for displaying the operation of an air conditioner for a vehicle or the like, pilot lamps or abbreviated letters such as "VENT" and "DEF" have been merely provided on or adjacent to the actuator panel to display the operating state of the air conditioner. However, with such manner of display, the occupant manipulating the air conditioner actuator has been unable to visually confirm the presence or absence of air flow from a specific duct outlet. Further, the prior art of air conditioning display using merely the pilot lamps and abbreviated letters such as "VENT" and "DEF" has been quite inconvenient for the user since he cannot readily identify the location of the duct outlet from which air is flowing out now. For the conveniences of the user, the air conditioner instruction manual has described how to use the air conditioner in detail over many pages.

SUMMARY OF THE INVENTION

With a view to obviate such prior art inconveniences, it is a primary object of the present invention to provide a novel air conditioning display system for a vehicle, in which the flowing patterns of air into and out of a plurality of ducts controlled by a plurality of dampers in a vehicle's air conditioner are pictorially displayed on a display panel in a form to be readily visually identified by the user, and a plurality of lamps turned on and off in interlocking relation with the manipulation of a function lever of an air conditioner actuator are used to viewably display the directions of air flow into and out of the ducts and presence or absence of such air flow.

BRIEF DESCRIPTION OF THE DRAWINGS

This invention will be explained by way of example with reference to the accompanying drawings in which.

DESCRIPTION OF THE PREFERRED EMBODIMENTS

A first embodiment of the present invention will now be described in detail with reference to FIGS. 1 to 8 and FIG. 12

Referring to FIGS. 1 to 8, a vehicle's air conditioner proper 1 includes an air duct 2, a fan unit 3 and a heater core 4. One end of the air duct 2 is branched into an external air intake duct 21 having an inlet 21' and a compartment air intake duct 22 having an inlet 22'. The other end of the air duct 2 is also branched into a defroster air discharge duct 23 having an outlet 23' and a pair of air discharge ducts 24 and 25 having outlets 24' and 25' directing air toward the foot portions of occupants on the front and rear seats respectively. A ventilation air discharge duct 26 having an outlet 26' is branched from an intermediate portion of the duct 2 for directing air toward the upper half of the body of an occupant sitting on the front seat. A first damper 27 is disposed between the external air intake duct 21 and the compartment air intake duct 22. A second damper 28 is disposed between the defroster air discharge duct 23 and the front and rear seat foot air discharge ducts 24 and 25. A third damper 29 is disposed between the ventilation air discharge duct 26 and the air duct 2. The fan unit 3 is disposed in the air duct 2 between the first damper 27 and the third damper 29, while the heater core 4 is disposed in the art duct 2 between the third damper 29 and the second damper 28 to be supplied with engine cooling water. A valve 40 regulates the amount of engine cooling water supplied to the heater core 4.

Figure 1:
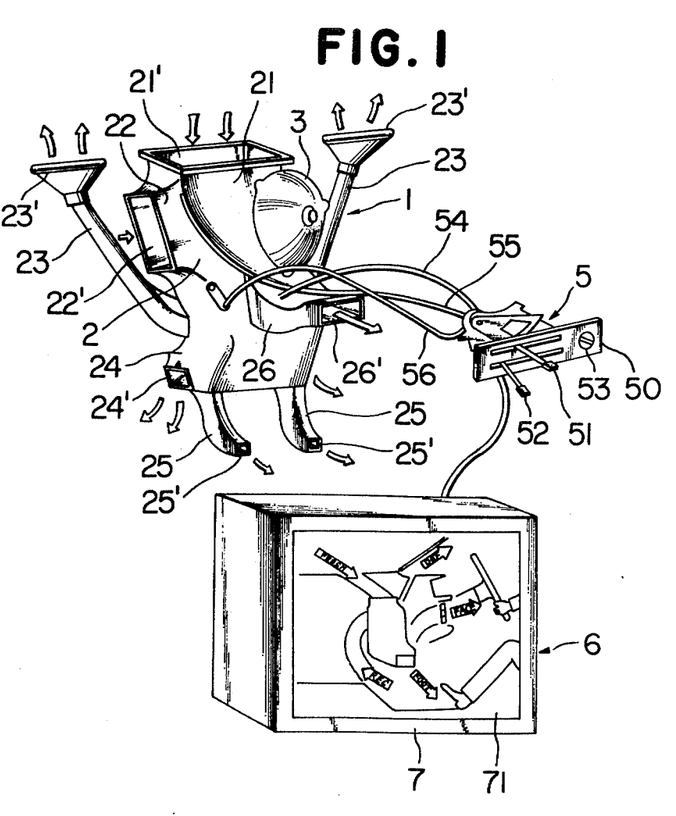
FIG. 1 is a schematic perspective view of a first embodiment of the air conditioning display system according to the present invention.
Figure 2:
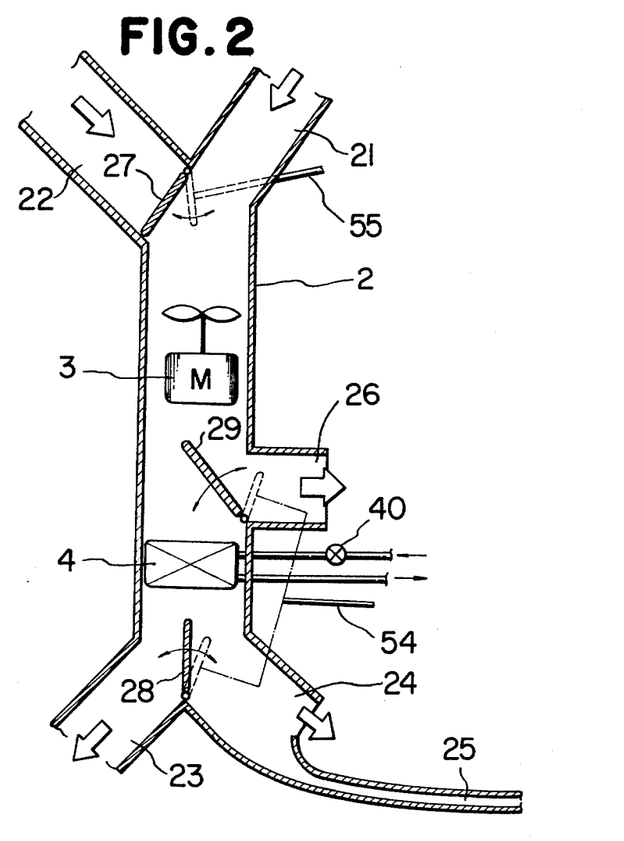
FIG. 2 illustrates part of an air conditioner proper shown in FIG. 1.
Figure 3:
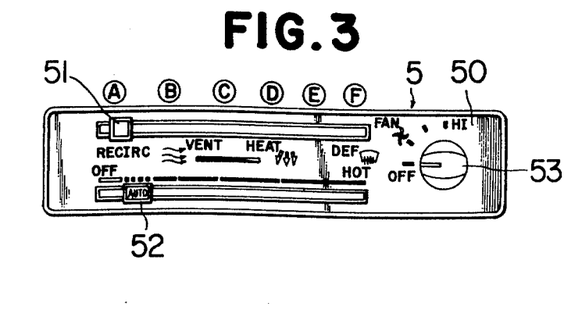
FIG. 3 is an enlarged front elevational view of an air conditioner acutator shown in FIG. 1.

A conventional air conditioner actuator 5 is mounted adjacent to the instrument panel IP of the vehicle and includes an actuator panel 50, a function lever 51, a heater lever 52 and a fan switch 53. The function lever 51 is movable in the longitudinal direction of the actuator panel 50 and is operatively connected with the first to third dampers 27 to 29 by a link mechanism 511 (FIG. 8) and cables 54 and 55. When the function lever 51 is moved to a position A labeled "RECIRC" on the panel 50, the first damper 27 closes the external air intake duct 21 and opens the compartment air intake duct 22, and the third damper 29 closes the air duct 2 and opens the ventilation air discharge duct 26. When the function lever 51 is moved to another position B labeled "VENT" on the panel 50, the first damper 27 opens the external air intake duct 21 and closes the compartment air intake duct 22, while the third damper 29 remains in the position corresponding to the "RECIRC" position of the lever 51 to discharge external air from the outlet 26' of ventilation air discharge duct 26. No warm air is discharged from this outlet 26'. When the function lever 51 is moved to another position D labeled "HEAT" on the panel 50, the first damper 27 opens the external air intake duct 21 as in the "VENT" position of the lever 51, while the third damper 29 closes the ventilation air discharge duct 26, and the second damper 28 closes the defroster air discharge duct 23 and opens the front and rear seat foot air discharge ducts 24 and 25. When the function lever 51 is moved to another position C (BI-LEVEL) intermediate the "VENT" position and the "HEAT" position on the panel 50, the third damper 29 is placed in its neutral position as shown in FIG. 2, and air flows out from the ducts 26, 24 and 25. When the function lever 51 is moved to another position F labeled "DEF" on the panel 50, the third damper 29 closes the ventilation air discharge duct 26, and the second damper 28 opens the defroster air discharge duct 23 and closes the front and rear seat foot air discharge ducts 24 and 25. When the function lever 51 is moved to another position E intermediate the "HEAT" position and the "DEF" position on the panel 50, the second damper 28 is placed in its neutral position as shown in FIG. 2, and the ducts 23, 24 and 25 are opened partly to permit flow of air thereinto.

The heater lever 52 is operatively connected by a cable 56 with the valve 40, and this valve 40 is full closed when the heater lever 52 is moved to the "OFF" position at the left-hand end of its stroke in FIG. 3. As the heater lever 52 is moved toward the right in FIG. 3 from the "OFF" position, the opening of the valve 40 is gradually increased until finally the valve 40 is full opened when the heater lever 52 reaches the "HOT" position at the right-hand end of its stroke in FIG 3. The fan switch 53, which actuates the fan unit 3, is selectively placed in one of the "OFF", "Lo", "M" and "H" positions.

Figure 4:
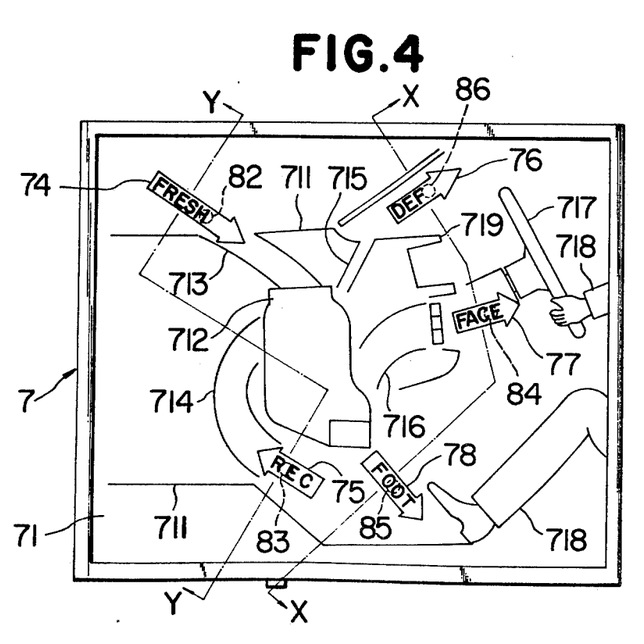
FIG. 4 is an enlarged view of a display panel shown in FIG. 1.
Figure 5:
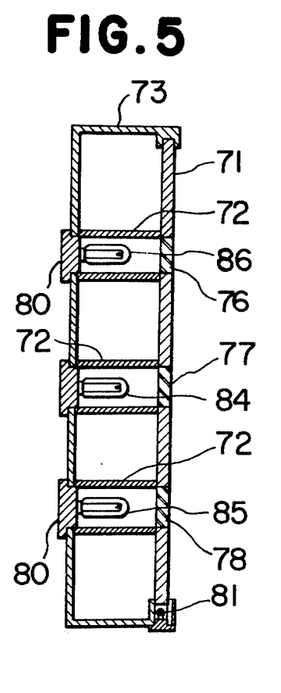
FIG. 5 is a sectional view taken along the line X—X in FIG. 4.
Figure 6:
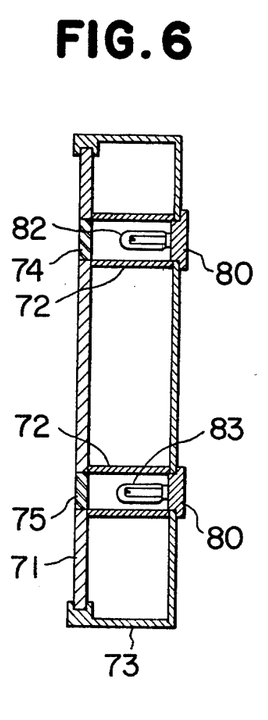
FIG. 6 is a sectional view taken along the line Y—Y in FIG. 4.
Figure 7:
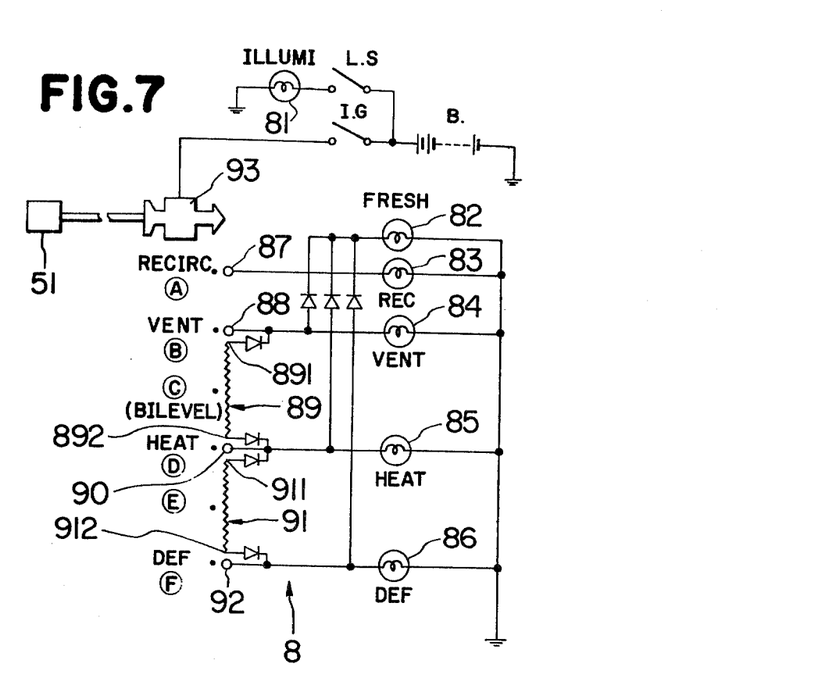
FIG. 7 is a circuit diagram of a control section in the first embodiment.

Air conditioning display device 6 comprises a display section 7 shown in FIGS. 4 to 6 and FIG. 12 and a control section 8 shown in FIG. 7. Referring to FIGS. 4 to 6, the display section 7 is disposed in the instrument panel ID and includes a display panel 71, shielding plates 72 and a casing 73. The display panel 71 is in the form of a smoked plate of glass or acrylic resin. A profile 711 of vehicle body including bonnet, front glass and floor panel, a profile 712 of the air conditioner proper 1, profiles 713, 714, 715 and 716 of the ducts 21, 22, 23 and 26 extending from the air conditioner proper, a profile 717 of a steering wheel, a profile 718 of the hand and foot of the driver and a profile 719 of the instrument panel are depicted on the front face of the smoked plate with a paint of white color. The display panel 71 is formed with "FRESH" display pattern 74, "RECIRC" display pattern 75, "DEF" display pattern 76, "VENT" display pattern 77 and "HEAT" display pattern 78. The "FRESH" display pattern 74 displaying flow of fresh air into the vehicle's compartment is provided by cutting out the portion of the display panel 71 adjacent to an open end of the profile 713 of the duct 21 in the form of an arrow shaped slot extending toward the profile 713, and by attaching in the slot a blue acrylic plate having letters "FRESH" depicted thereon in black. The "RECIRC" display pattern 75 displaying recirculation of compartment air is provided by cutting out the portion of the display panel 71 adjacent to an open end of the profile 714 of the duct 22 in the form of an arrow shaped slot extending toward the profile 714, and by attaching in the slot a green acrylic plate having letters "REC" depicted thereon in black. The "DEF" display pattern 76 displaying flow of air out of the outlet 23' of defroster air discharge duct 23 is provided by cutting out the portion of the display panel 71 adjacent to an open end of the profile 715 of the duct 23 in the form of an arrow shaped slot extending from the profile 715, and by fitting into the slot a red acrylic plate having letters "DEF" depicted thereon in black. The "VENT" display pattern 77 displaying flow of air out of the outlet 26' of ventilation air discharge duct 26 is provided by cutting out the portion of the display panel 71 adjacent to an open end of the profile 716 of the duct 26 in the form of an arrow shaped slot extending from the profile 716, and by attaching in the slot a blue acrylic plate having letters "FACE" depicted thereon in black. The "HEAT" display pattern 78 displaying flow of air out of the outlets 24' and 25' of front and rear seat foot air discharge ducts 24 and 25 is provided by cutting out the portion of the display panel 71 adjacent to an opening appearing in the profile 712 of the air conditioner proper in the form of an arrow shaped slot extending from said opening, and by fitting into the slot a red acrylic plate having letters "FOOT" depicted thereon in black. The acrylic plates providing the display patterns 74 to 78 are pervious to light as a frosted glass, and the display patterns are visible to the eyes of the occupant only when the air conditioning display device is in operation. The casing 73 is in the form of a box and fixedly supports peripheral edges of the display panel 71 to define a space between the back face of the display panel 71 and the casing. A first illuminating lamp 81 is detachably mounted in the casing so as to illuminate the lower edge of the display panel 71. The shielding plates 72 are in the form of walls which surround the display patterns 74 to 78 at the back face of the display panel 71, and connected at their one ends with said back face of the display panel 71 and at the other ends with the casing 73. Second, third, fourth, fifth and sixth lamps 82, 83, 84, 85 and 86 are inserted in spaces behind the display patterns 74, 75, 77, 78 and 76 surrounded by the shielding plates 72 respectively. The lamps 82 to 86 are detachably mounted in the casing 73 by means of sockets 80.

Figure 8:
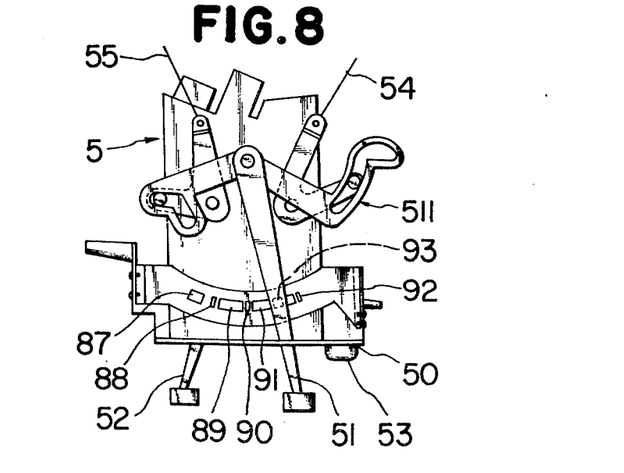
FIG. 8 is an enlarged plan view of the air conditioner actuator shown in FIG. 1.

Referring to FIG. 7, the control section 8 comprises the first to sixth lamps 81 to 86, first, second, third and fourth electrical contacts 87, 88, 90 and 92, and first and second distribution resistors 89 and 91. The first lamp 81 is connected at one terminal thereof with a lighting switch L.S used for the on-off of the vehicle's head lamps, clearance lamps, etc. The first electrical contact 87 is connected with one terminal of the third lamp 83, and the second electrical terminal 88 is connected with one terminal of the fourth lamp 84 and with one terminal of the second lamp 82 through a diode. The third electrical contact 90 is connected with one terminal of the fifth lamp 85 and with the one terminal of the second lamp 82 through another diode. The fourth electrical contact 92 is connected with one terminal of the sixth lamp 86 and with the one terminal of the second lamp 82 through another diode. The first distribution resistor 89 is disposed between the second and third electrical contacts 88 and 90. A first terminal 891 of the resistor 89 is disposed adjacent to the second electrical contact 88 and connected with a connection between the second electrical contact 88 and the fourth lamp 84 through a diode, while a second terminal 892 is disposed adjacent to the third electrical contact 90 and connected with a connection between the third electrical contact 90 and the fifth lamp 85 through another diode. The second distribution resistor 91 is disposed between the third and fourth electrical contacts 90 and 92. A first terminal 911 of the resistor 91 is disposed adjacent to the third electrical contact 90 and connected with the connection between the third electrical contact 90 and the fifth lamp 85 through a diode, while a second terminal 912 is disposed adjacent to the fourth electrical contact 92 and connected with a connection between the fourth electrical contact 92 and the sixth lamp 86 through another diode. The other terminals of the first to sixth lamps 81 to 86 are grounded. A slider 93 provided on the end of the function lever 51 remote from the manipulated end thereof is connected with an ignition key switch I.G and slidable to contact with the first and second electrical contacts 87 and 88, first distribution resistor 89, third electrical contact 90, second distribution resistor 91 and fourth electrical contact 92 upon slidable movement of the function lever 51. The slider 93 is mounted on the lower surface of the function lever 51 at an intermediate portion thereof with its contact directing downward, as shown in FIG. 8. The first to fourth electrical contacts 87, 88, 90 and 92 and the first and second distribution resistors 89 and 91 are positioned on the upper surface of the air conditioner actuator 5 and in a track of arcuate movement of the slider 93 so as to contact with the slider 93. In FIG. 7, positioning relationship between the slider 93 and the first to fourth electrical contacts 87, 88, 91 and 92 and first and second distribution resistors 89 and 91 is merely schematically illustrated for conveniences of explanation.

In operation, suppose that the ignition key switch I.G is turned on.

Then, when the function lever 51 is moved to the position A labeled "RECIRC", the slider 93 is brought into contact with the first electrical contact 87. Current from a battery B is supplied through the slider 93 to the third lamp 83 to energize the same. Consequently, the "RECIRC" display pattern 75 is illuminated by light emitted from the third lamp 83 thereby illuminating this display pattern in green. The letters "REC" depicted on the acrylic plate of the display pattern 75 are also visible to the eyes of the occupant.

When the function lever 51 is moved to the position B labeled "VENT", the slider 93 is brought into contact with the second electrical contact 88 to energize the second and fourth lamps 82 and 84. Consequently, the "FRESH" display pattern 74 is illuminated in blue by light emitted from the second lamp 82, and the letters "FRESH" depicted on the acrylic plate of the display pattern 74 are relieved against the blue acrylic plate to be easily visible. Also, the "VENT" display pattern 77 is illuminated in blue by energization of the fourth lamp 84, and the black letters "FACE" depicted on the acrylic plate of the display pattern 77 are visible to the eyes of the occupant.

When the function lever 51 is moved to the position D labeled "HEAT", the slider 93 is brought into contact with the third electrical contact 90 to energize the second and fifth lamps 82 and 85. Consequently, the "FRESH" display pattern 74 is illuminated in blue, and the black letters "FRESH" are visible. Also, the "HEAT" display pattern 78 is illuminated by energization of the fifth lamp 85 thereby illuminating this display pattern in red. At the same time, the letters "FOOT" depicted on the acrylic plate of the display pattern 78 in black are visible to the eyes of the occupant.

When the function lever 51 is moved to the position F labeled "DEF", the slider 93 is brought into contact with the fourth electrical contact 92 to energize the second and sixth lamps 82 and 86. Consequently, the "FRESH" display pattern 74 is illuminated in blue, and the letters "FRESH" are visible. Also, the "DEF" display pattern 76 is illuminated by light emitted from the sixth lamp 86 thereby illuminating this display pattern in red. At the same time, the letters "DEF" depicted on the acrylic plate of the display pattern 76 in black are visible to the eyes of the occupant.

When the function lever 51 is moved to the position C (BILEVEL) in the middle of the "VENT" and "HEAT" positions, the slider 93 is brought into contact with the first distribution resistor 89 at the middle position thereof. Since resistance values of the resistor 89 between the middle position thereof and the first terminal 891 and between the middle position and the second terminal 892 are equal, a half of current supplied through the ignition key switch I.G is supplied to each of the first and second terminals 891 and 892. Consequently, the fourth and fifth lamps 84 and 85 are illuminated with the same brightness, but the brightness is weaker than when the function lever 51 is in the "VENT" position B and the "HEAT" position D.

As the function lever 51 is moved from the position C toward the "VENT" position B, the resistance value of the resistor 89 between a position of the resistor engaged by the slider 93 and the first terminal 891 is gradually reduced so that the fourth lamp 84 becomes gradually bright. The fifth lamp 85 becomes gradually dark since the resistance value of the resistor 89 between the position of the resistor engaged by the slider 93 and the second terminal 892 is gradually increased. Contrary to the above, as the function lever 51 is moved from the position C toward the "HEAT" position D, the fourth lamp 84 becomes gradually dark while the fifth lamp 85 becomes gradually bright.

In this case, the second lamp 82 is continuously supplied with current from the first and second terminals 891 and 892 to maintain the same brightness as when the function lever 51 is in the "VENT" position B.

When the function lever 51 is moved to the position E in the middle of the "HEAT" and "DEF" positions, the slider 93 is brought into contact with the second distribution resistor 91 at the middle position thereof. Since resistance values of the resistor 91 between the middle position thereof and the first terminal 911 and between the middle position and the second terminal 912 are equal, a half of current supplied through the ignition key switch I.G and the slider 93 is supplied to each of the first and second terminals 911 and 912. Consequently, the fifth and sixth lamps 85 and 86 are illuminated with the same brightness, but the brightness is weaker than when the function lever 51 is in the "HEAT" and "DEF" position D and F.

As the function lever 51 is movved from the position E toward the "HEAT" position D, the slider 93 slides on the second distribution resistor 92 from the middle position thereof toward the first terminal 911. Consequently, the resistance value between the slider 93 and the first terminal 911 is gradually reduced so that the fifth lamp 85 becomes gradually bright. The sixth lamp 86 becomes gradually dark since the resistance value between the slider 93 and the second terminal 912 is gradually increased. On the contrary, as the function lever 51 is moved from the position E toward the "DEF" position F, the fifth lamp 85 becomes gradually dark while the sixth lamp 86 becomes gradually bright.

In these cases, the second lamp 82 maintains its brightness at a constant value irrespective of the positions of the function lever 51 since it is supplied with current from the first and second terminals 911 and 912, as in the cases when the lever 51 is in a position between the positions B and D.

It will be understood from the above description that the specific display patterns 74 to 78 displaying the suction and discharge of air into and out of the specific ducts in the vehicle's air conditioner proper 1 become luminant on the display panel 71 in accordance with the actual operating mode of the air conditioner proper, so that the driver and other occupants of the vehicle compartment can readily visually confirm the operating state of the air conditioner proper 1. Further, an occupant who has not sufficient knowledge as to the manipulation of the air conditioner will be able to make necessary manipulation for discharging air from any desired duct outlets and introducing external air or compartment air into the air conditioner proper 1 by merely actuating the function lever 51 while observing the display patterns appearing on the display panel 71.

Further, the "VENT" display pattern 77, "HEAT" display pattern 78 and "DEF" display pattern 76 are illuminated with their brightness proportional to flow rates of air discharged out of the corresponding duct outlets when the function lever 51 is in a position between the "VENT" and "HEAT" positions and a position between the "HEAT" and "DEF" positions. Thus, the occupant can readily visually confirm the flow rate of air discharged out of the duct outlets.

In the first embodiment described hereinbefore, the "DEF" display pattern 76 and "HEAT" display pattern 78 are formed by the red acrylic plates. The use of such plates is preferable since the display patterns 76 and 78 are illuminated in red when the heater is operated with the heater lever 52 kept in the position moved from the "OFF" position to supply the engine cooling water to the heater core 4, and this manner of color display matches well with the actual operating mode of the air conditioner. Also, the "VENT" display pattern 77 is formed by the blue acrylic plate to be illuminated in blue. Thus, such provision of the blue acrylic plate matches well with the actual operating mode of the air conditioner, since air discharged out of the outlet 26' of ventilation air discharge duct 26 will never pass through the heater core 4.

In the first embodiment, the display patterns 74 and 77 are formed by the blue acrylic plates, the display pattern 75 is formed by the green acrylic plate, and the display patterns 76 and 78 are formed by the red acrylic plates. However, any other suitable colors or combination of colors may be employed. For example, blue or green acrylic plates may be used for all the display patterns.

In the first embodiment, the lamps are used for illuminating the display patterns. In lieu of these lamps, light-emitting diodes or any other suitable elements may be used.

Figure 11:
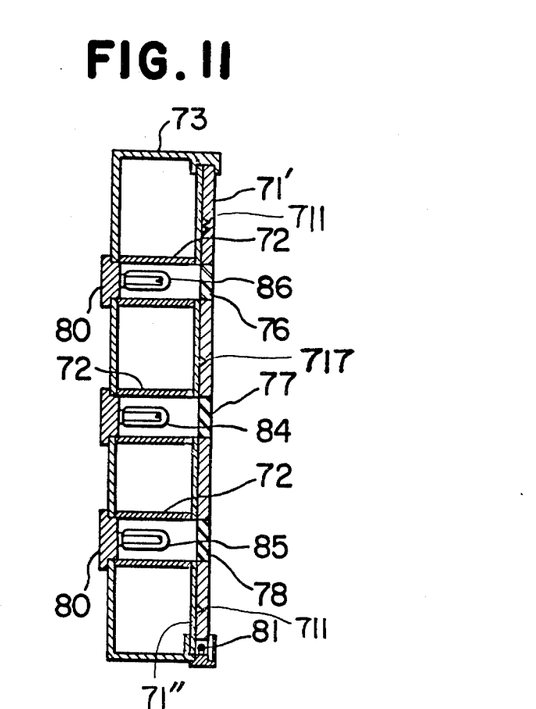
FIG. 11 is a section through a modified display panel of the invention.
Figure 12:
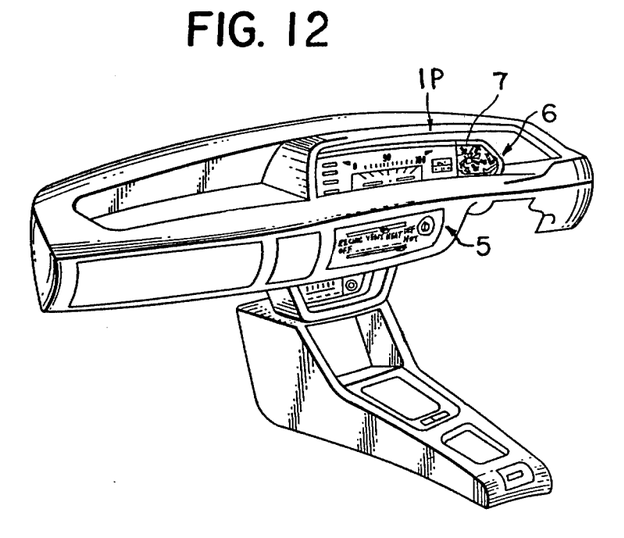
FIG. 12 is a perspective view of another display panel of the invention.

In the first embodiment, the display panel 71 is formed by the smoked plate having the profiles 711 to 719 depicted on the front face thereof in white. However, as shown in FIG. 11 the display panel 71' may be in the form of a transparent plate, V-shaped grooves defining the profiles 711 to 719 may be formed on the back face of the transparent display panel 71', and a opaque plate 71" may be attached thereto. In this case, the first illuminating lamp 81 should be connected with the ignition key switch I.G so that it is energized whenever the display device 6 is in operation. Also, in lieu of the V-shaped grooves, the profiles 711 to 719 may be depicted on the back face of the transparent display panel with a paint of white.

Figure 13:
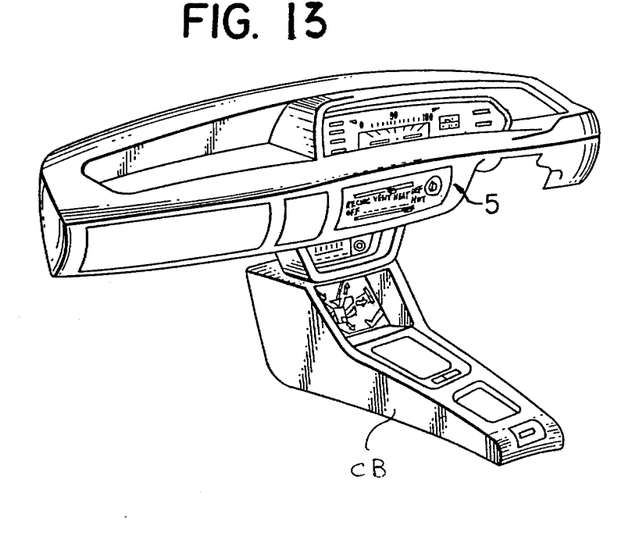
FIG. 13 is a perspective view of a console box and associated dash means.
Figure 14:
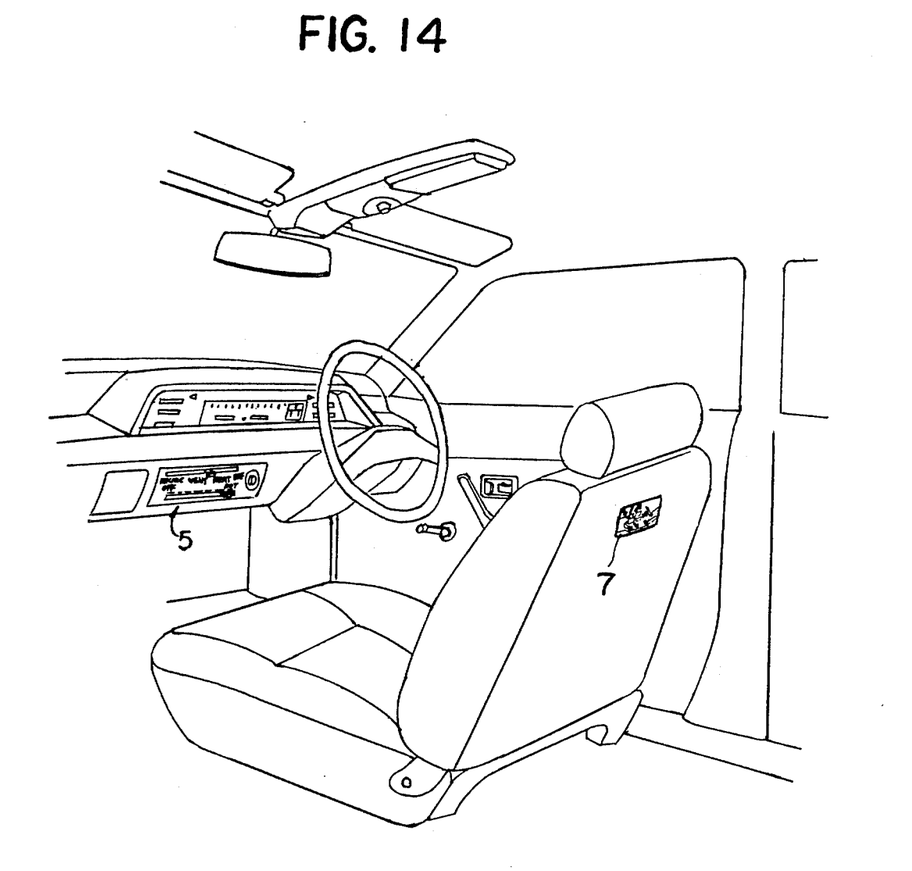
FIG. 14 is a perspective view of the back of a front seat and showing a display panel provided thereon.
Figure 15:
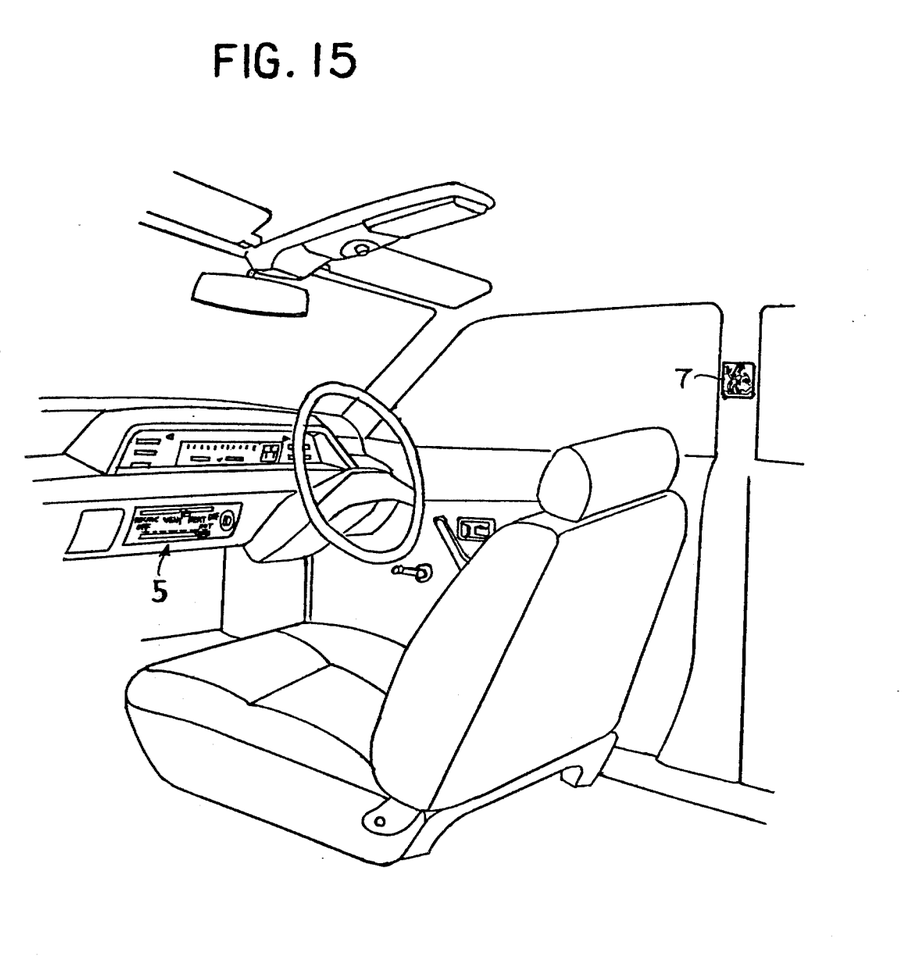
FIG. 15 is a perspective view of the inside of a vehicle compartment with a display section on the sidewalls thereof.
Figure 16:
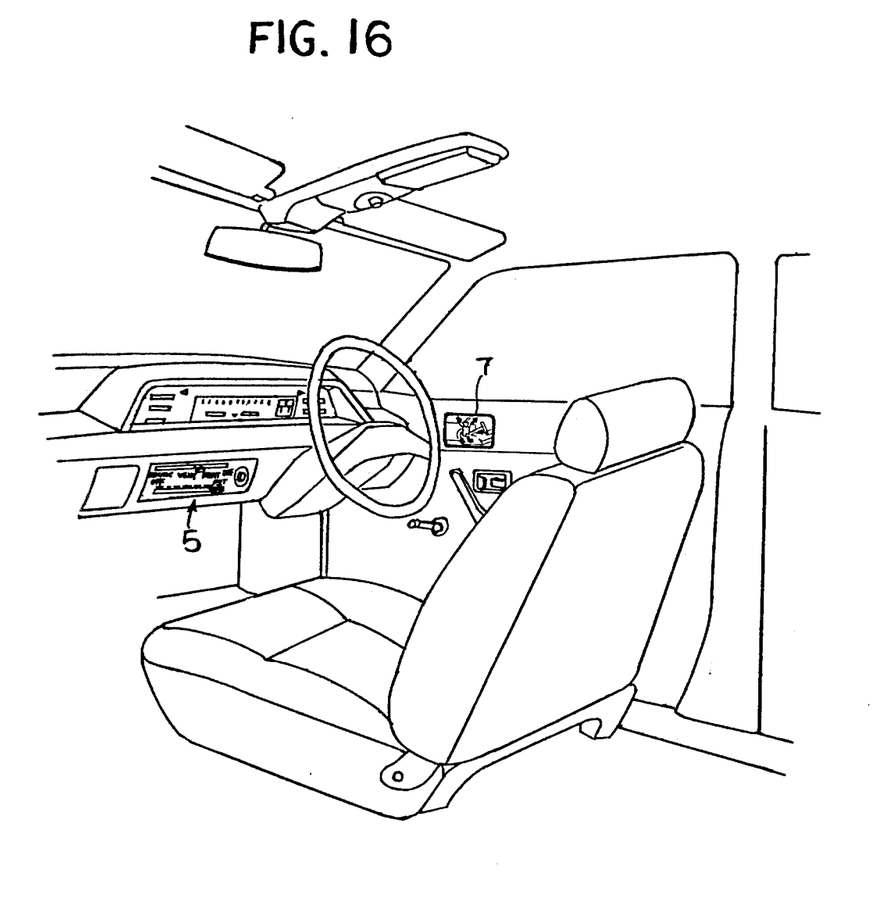
FIG. 16 is a perspective view of the interface of a door with a display panel positioned thereon; and, FIG. 17 is a perspective view of the inside of a vehicle compartment showing a display panel on the ceiling thereof.
Figure 17:
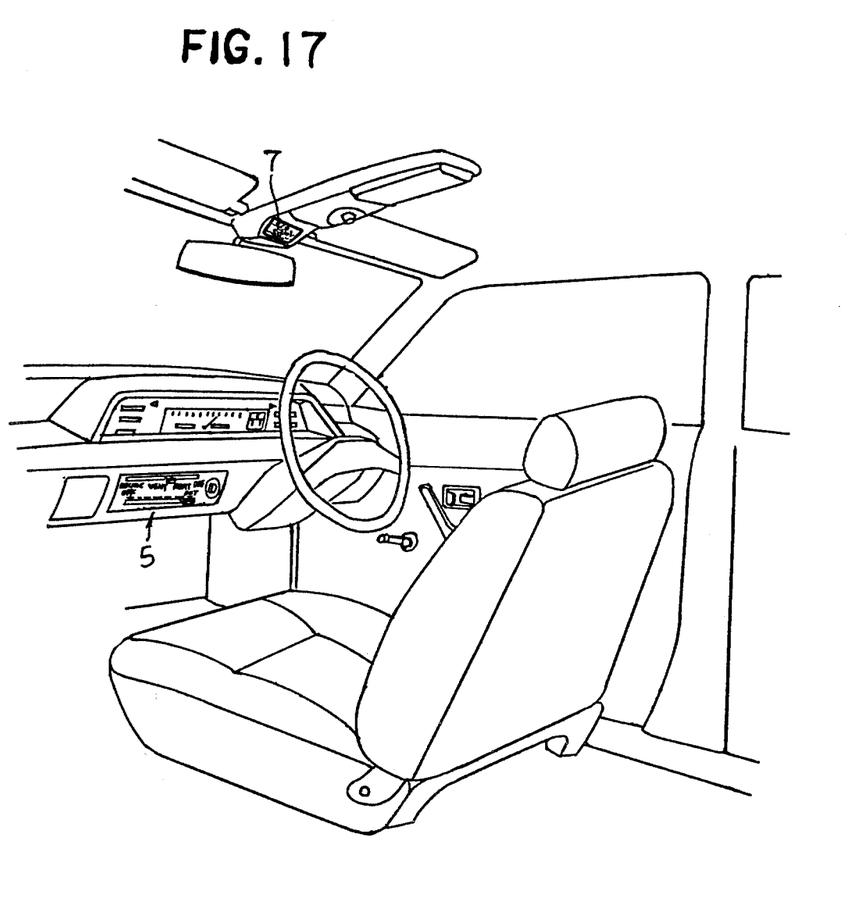

Further, although the display device 6 is disposed adjacent to the instrument panel in the first embodiment, this display section 7 may be disposed in any other portion of the vehicle such as center console box CB as shown in FIG. 13, back face of seat back of front seat as shown in FIG. 14, side walls of vehicle compartment as shown in FIG. 15, inner face of door as shown in FIG. 16, and ceiling of vehicle compartment as shown in FIG. 17.

Figure 9:
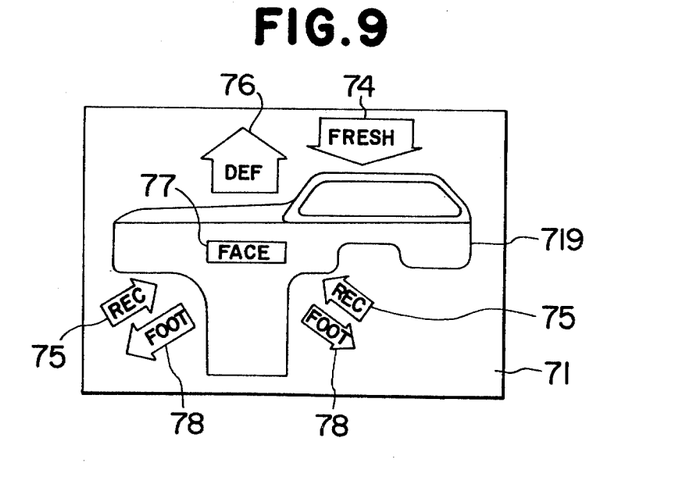
FIG. 9 is an enlarged view of a display panel in a second embodiment of the present invention.

FIG. 9 shows a second embodiment in which the display panel 71 in the first embodiment is modified. The profile 719 showing a front view of the instrument panel is depicted on the display panel 71 with a paint of white. Two "HEAT" display patterns 78 and two "RECIRC" display patterns 75 are provided on the display panel 71.

Figure 10:
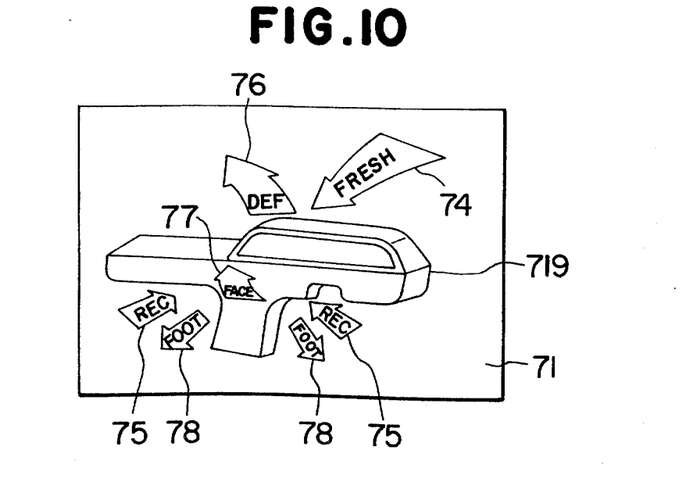
FIG. 10 is an enlarged view of a display panel in a third embodiment of the present invention.

FIG. 10 shows a third embodiment, or a modification of the second embodiment, in which the profile 719 illustrating a perspective view of the instrument panel is depicted on the display panel 71.

What is claimed is:

1. An air conditioning display system for a vehicle comprising a vehicle's air conditioner proper including at least a plurality of air intake ducts, a plurality of air discharge ducts, a plurality of dampers disposed in said ducts for closing and opening said ducts, and a fan unit, air conditioner actuating means for actuating at least said dampers and said fan unit in said air conditioner proper thereby introducing and discharging air into and out of said air conditioner proper, and a display device mounted in said vehicle and including a display panel carrying the picture of the vehicle body portions at least around the front seat and displaying the flowing patterns of air out of said air conditioner proper on the portions of said display panel corresponding to the vehicle body portions at which air flows out of said air conditioner proper in response to the manipulation of said air conditioner actuating means.

2. An air conditioning display system as claimed in claim 1, wherein said display device displays the flowing patterns of air into and out of said air conditioner proper on the portions of said display panel corresponding to the vehicle body portions at which air flows into and out of said air conditioner proper in response to the manipulation of said air conditioner actuating means.

3. An air conditioning display system as claimed in claim 1, wherein said display device comprises switch means selectively turned on and off for selectively energizing and deenergizing illuminating means in response to the manipulation of said air conditioner actuating means, whereby the energization of said illuminating means provides luminant display of the flowing patterns of air out of said air conditioner proper on the portions of said display panel corresponding to the vehicle body portions at which air flows out of said air conditioner proper.

4. An air conditioning display system as claimed in claim 3, wherein said flowing patterns of air out of said air conditioner proper are displayed on said display panel with arrows extending toward the directions of discharge of air.

5. An air conditioning display system as claimed in claim 3, wherein said flowing patterns of air out of said air conditioner proper are displayed on said display panel with letters.

6. An air conditioning display system as claimed in claim 3, wherein said flowing patterns of air out of said air conditioner proper are displayed on the display panel with letters and with arrows extending toward the directions of discharge of air.

7. An air conditioning display system as claimed in claim 6, wherein said letters are surrounded by said arrows.

8. An air conditioning display system as claimed in claim 2, wherein said display device comprises switch means selectively turned on and off for selectively energizing and deenergizing illuminating means in response to the manipulation of said air conditioner actuating means, whereby the energization of said illuminating means provides luminant display of the flowing patterns of air into and out of said air conditioner proper on the portions of said display panel corresponding to the vehicle body portions at which air flows into and out of said air conditioner proper.

9. An air conditioning display system as claimed in claim 8, wherein said flowing patterns of air into and out of said air conditioner proper are displayed on said display panel with arrows extending toward the directions of flow of air.

10. An air conditioning display system as claimed in claim 8, wherein said flowing patterns of air into and out of said air conditioner proper are displayed on said display panel with letters.

11. An air conditioning display system as claimed in claim 8, wherein said flowing patterns of air into and out of said air conditioner proper are displayed on said display panel with letters and with arrows extending toward the directions of flow of air.

12. An air conditioning display system as claimed in claim 11, wherein said letters are surrounded by the arrows.

13. An air conditioning display system as claimed in claim 1, wherein said picture of the vehicle body portions includes longitudinal profiles of the bonnet, front glass, air conditioner proper and ducts extending therefrom, and a longitudinal profile of the instrument panel, said profiles being depicted on the display panel.

14. An air conditioning display system as claimed in claim 1, wherein said picture of the vehicle body portions includes a profile of the instrument panel depicted on said display panel.

15. An air conditioning display system as claimed in claim 2, wherein said picture of the vehcle body portions includes longitudinal profiles of the bonnet, front glass, air conditioner proper and ducts extending therefrom, and a longitudinal profile of the instrument panel, said profiles being depicted on the display panel.

16. An air conditioning display system as claimed in claim 2, wherein said picture of the vehicle body portions includes a profile of the instrument panel depicted on said display panel.

17. An air conditioning display system as claimed in claim 3, wherein said display device includes a plurality of members forming said flowing patterns of air out of said air conditioner proper and attached in a plurality of slots formed in said display panel, and partition members fixed to said display panel and partitioning spaces behind said plurality of members from each other, said illuminating meanns being provided in said spaces and illuminating selectively said plurality of members to display the flowing patterns of air out of said air conditioner proper when the illuminating means is energized.

18. An air conditioning display system as claimed in claim 17, wherein said pictures of said vehicle body portions are provided by V-shaped grooves formed on said display panel, and another illuminating means is disposed on one side of said display panel to illuminate said picture with light emitted from said illuminating means.

19. An air conditioning display system as claimed in claim 8, wherein said display panel is in the form of a smoked plate and depicted on its front face said picture of said vehicle body portions, said display panel having a plurality of slots, and said display device further includes a plurality of members forming said flowing patterns of air into and out of said air conditioner proper and attached in said slot in said display panel, and partitioning members fixed to said display panel and partitioning spaces behind said plurality of members from each other, said illuminating means being provided in said spaces and illuminating selectively said plurality of members to display the flowing patterns of air into and out of said air conditioner proper when the illuminating means is energized.

20. An air conditioning display system as claimed in claim 19, wherein another illuminating means is disposed on one side of said display panel and connected with a lighting switch used for turning on and off of vehicle's head lamps.

21. An air conditioning display system as claimed in claim 19, wherein said pictures of said vehicle body portions are provided by V-shaped grooves formed on said display panel, and another illuminating means is disposed on one side of said display panel to illuminate said picture with light emitted from said illuminating means.

22. An air conditioning display system as claimed in claim 19, wherein said plurality of members providing said flowing patterns are formed of material which is pervious to light, said flowing patterns being visible only when said display device is in operation.

23. An air conditioning display system as claimed in claim 3, wherein said display device includes a "VENT" display pattern provided on said display panel for displaying the discharge of air toward the upper half of the body of an occupant, a "HEAT" display pattern provided on said display panel for displaying the discharge of air toward the foot portion of an occupant, a "DEF" display pattern provided on said display panel for displaying the discharge of air toward the vehicle front glass, a first illuminating element adapted to be energized to illuminate said "VENT" display pattern when a function lever provided in said air conditioner actuating means for operating the dampers in said air conditioner proper is in a ventilation air discharging positon, a second illuminating element adapted to be energized to illuminate said "HEAT" display pattern in a foot air discharging position of said function lever, and a third illuminating element adapted to be energized to illuminate said "DEF" display pattern in a defroster air discharging position.

24. An air conditioning display system as claimed in claim 23, wherein said display device includes a slider provided on said function lever and connected with one terminal of the power source, and first, second and third electrical contacts provided on said air conditioner actuating means and connected with said first, second and third illuminating elements respectively, said slider being in contact with said first electrical contact in the ventilation air discharging position of said function lever, with said second electrical contact in the foot air discharging position of said function lever and with said third electrical contact in the defroster air discharging position of said function lever.

25. An air conditioning display system as claimed in claim 24, wherein said display device includes a first distribution resistor provided between said first and second electrical contacts on said air conditioner actuating means along a track of movement of said slider, and connected at its one end with said first illuminating element and at its other end with said second illuminating element, said slider being in contact with the position on said first distribution resistor corresponding to the position of said function lever when said function lever is positioned between the ventilation air discharging position and the foot air discharging position.

26. An air conditioning display system as claimed in claim 24, wherein said display device includes a second distribution resistor provided between said second and third electrical contacts on said air conditioner actuating means along a track of movement of said slider, and connected at its one end with said second illuminating element and at its other end with said third illuminating element, said slider being in contact with the position on said second distribution resistor corresponding to the position of said function lever when said function lever is positioned between the foot air discharging position and the defroster air discharging position.

27. An air conditioning display system as claimed in claim 8, wherein said display device includes a "VENT" display pattern provided on said display panel for displaying the discharge of air toward the upper half of the body of an occupant, a "HEAT" display pattern provided on said display panel for displaying the discharge of air toward the foot portion of an occupant, a "DEF" display pattern provided on said display panel for displaying the discharge of air toward the vehicle front glass, a "FRESH" display pattern provided on said display panel for displaying the introduction of external air into the vehicle compartment, a "RECIRC" display pattern provided on said display panel for displaying the recirculation of air in the vehicle compartment, a first illuminating element adapted to be energized to illuminate said "VENT" display pattern when a function lever provided in said air conditioner actuating means for operating the dampers in said air conditioner proper is in a ventilation air discharging position, a second illuminating element adapted to be energized to illuminate said "HEAT" display pattern in a foot air discharging position of said function lever, a third illuminating element adapted to be energized to illuminate said "DEF" display pattern in a defroster air discharging position, a fourth illuminating element adapted to be energized to illuminate said "RECIRC" display pattern in a compartment air recirculating position of said function lever, and a fifth illuminating element adapted to be energized to illuminate said "FRESH" display pattern when said function lever is in any positions removed from said compartment air recirculating position.

28. An air conditioning display system as claimed in claim 27, wherein said display device includes a slider provided on said function lever and connected with one terminal of the power source, said first, second, third and fourth electrical contacts provided on said air conditioner actuating means and connected with said first, second, third and fourth illuminating elements respectively, said fifth illuminating element being connected with said first, second and third electrical contacts, said slider being in contact with said first electrical contact in the ventilation air discharging position of said function lever, with said second electrical contact in the foot air discharging position of said function lever, with said third electrical contact in the defroster air discharging position of said function lever, and with the fourth electrical contact in the compartment air recirculating position of said function lever.

29. An air conditioning display system as claimed in claim 28, wherein said display device includes a first distribution resistor provided between said first and second electrical contacts on said air conditioner actuating means along a track of movement of said slider and connected at its one end with said first illuminating element and at its other end with said second illuminating element, and a second distribution resistor provided between said second and third electrical contacts on said air conditioner actuating means along the track of movement of said slider and connected at its one end with said second illuminating element and at its other end with said third illuminating element, said slider being in contact with the position on said first distribution resistor corresponding to the position of said function lever when said function lever is positioned between the ventilation air discharging position and the foot air discharging position, and with the position on said second distribution resistor corresponding to the position of said function lever when said function lever is positioned between the foot air discharging position and the defroster air discharging position.

30. An air conditioning display system as claimed in claim 1, wherein said display device is provided in the vehicle instrument panel.

31. An air conditioning display system as claimed in claim 1, wherein said display device is provided in the vehicle center console box.

32. An air conditioning display system as claimed in claim 1, wherein said display device is provided in the back face of seat back of the vehicle front seat.

33. An air conditioning display system as claimed in claim 1, wherein said display device is provided in the side walls of the vehicle compartment.

34. An air conditioning display system as claimed in claim 1, wherein said display device is provided in the ceiling of the vehicle compartment.

* * * * *